(12) United States Patent
Metzger

(10) Patent No.: US 7,027,912 B1
(45) Date of Patent: Apr. 11, 2006

(54) METHOD AND SYSTEM FOR CONTROLLING AN ENGINE TO MAINTAIN A COMFORTABLE CABIN TEMPERATURE WITHIN A VEHICLE

(76) Inventor: William R. Metzger, 15423 Hwy. K-4, Valley Falls, KS (US) 66088

( * ) Notice: Subject to any disclaimer, the term of this patent is extended or adjusted under 35 U.S.C. 154(b) by 0 days.

(21) Appl. No.: 11/028,132

(22) Filed: Jan. 3, 2005

(51) Int. Cl.
*G06F 19/00* (2006.01)

(52) U.S. Cl. .................................... 701/112; 123/179.4

(58) Field of Classification Search ................ 701/112, 701/102, 113, 115; 123/179.4, 179.5, 179.15; 62/133, 181, 183
See application file for complete search history.

(56) References Cited

U.S. PATENT DOCUMENTS

| | | | |
|---|---|---|---|
| 4,994,958 A * | 2/1991 | Iida .............................. | 701/36 |
| 5,072,703 A | 12/1991 | Sutton | |
| 5,317,998 A | 6/1994 | Hanson et al. | |
| 5,644,924 A | 7/1997 | Carr et al. | |
| 5,732,676 A | 3/1998 | Weisman et al. | |
| 6,351,703 B1 | 2/2002 | Avery, Jr. | |
| 6,651,895 B1 * | 11/2003 | Kadle et al. .................. | 62/178 |
| 6,712,133 B1 | 3/2004 | Kyrtsos et al. | |
| 2005/0178132 A1 * | 8/2005 | Sakaguchi et al. ............ | 62/181 |

* cited by examiner

*Primary Examiner*—Hieu T. Vo
(74) *Attorney, Agent, or Firm*—Invention Protection Associates, LLC

(57) ABSTRACT

A method and system for controlling an engine in order to maintain a comfortable cabin temperature within a vehicle that is equipped with an engine, a battery and a heating/cooling apparatus including determining an acceptable range of cabin temperatures, monitoring cabin and outside air temperatures, controlling automatic starting of the vehicle engine when both temperatures are outside of the acceptable range and running the engine only as is minimally necessary to maintain the cabin temperature within the acceptable range.

18 Claims, 3 Drawing Sheets

METHOD AND SYSTEM FOR CONTROLLING AN ENGINE TO MAINTAIN A COMFORTABLE CABIN TEMPERATURE WITHIN A VEHICLE

BACKGROUND OF TH INVENTION

1. Field of the Invention

The present invention relates to a method and system for automatically starting and stopping a vehicle engine during a non-driving period for the purpose of maintaining a comfortable temperature within the vehicle cabin.

2. Description of Prior Art

When the price of petroleum rises, the importance of reducing fuel consumption heightens proportionately for transportation and shipping businesses. That axiom is particularly true for businesses of the trucking industry, as fuel costs can be one of the largest business expenses that a trucking company incurs.

Of course, hauling heavily weighted cargo trailers is a reason for high fuel consumption. Another, and more avoidable, reason is prolonged engine idling during periods when freight trucks are not being driven. Often, a truck driver will idle the engine of his parked truck while he rests inside the cabin area of the vehicle. This engine idling allows operation of the air conditioning and heating system, powered by the vehicle's engine, to keep the cabin at a comfortable temperature. However, a significant amount of fuel may be consumed in the process. To wit, it is estimated that a typical diesel truck engine burns approximately one gallon of diesel fuel per hour of idling time. So, for some time, the trucking industry has recognized a particular need to develop ways of controlling cabin temperature of a non-moving vehicle in a fuel-efficient manner.

In addition to the general need for reducing the amount of fuel consumed by running an engine merely in order to maintain cabin comfort, there is the specific need to limit engine idling to conform with "anti-idling" laws that many states and local jurisdictions have enacted. These laws impose restrictions on engine idling for the purpose of controlling emissions. For example, the state of New York enacted a law prohibiting heavy-duty vehicles from idling more than five consecutive minutes, except under limited circumstances.

A way to limit, or avoid altogether, engine idling during non-driving periods is to use a generator-powered heating and cooling system. The generators, or "power packs", used effectively eliminate the need to run the engine for the sole purpose of operating a heating and cooling system. However, there are negative aspects of using power packs. First, they may be too expensive for a freight company to equip its entire fleet with or for an independent truck operator on a limited fiscal budget. Second, for a variety of reasons, they may not be compatible with all vehicles. Third, they significantly increase the total weight of the vehicle, as power packs can weigh over 700 pounds. Consequently, while a power pack may increase a vehicle's overall fuel economy by reducing the need for engine idling during non-driving, it may actually reduce fuel economy during driving.

Another solution for reducing engine idling time, and a solution that the present invention embodies, is a method and system for monitoring air temperatures and controlling operation of the engine accordingly to maintain a comfortable cabin temperature during non-driving periods. For examples, U.S. Pat. No. 5,317,998 to Hanson, et al. discloses several versions of a method for automatically starting and stopping a truck engine in order to conserve fuel while controlling the truck cabin temperature, and U.S. Pat. No. 5,072,703 to Sutton discloses an apparatus for doing the same.

Nevertheless, it can be appreciated that there exists a need for an improved method of controlling a vehicle engine principally to maintain a comfortable cabin temperature during non-driving periods. More specifically, there is a need for one that starts the engine only when temperatures inside and outside the vehicle cabin are both above or both below a temperature range deemed acceptable by the vehicle operator. There is a secondary need for an engine control method in which the duration of each idling interval may be limited in accordance with the operator's pre-set instruction—an instruction that can be completely arbitrary or may be specifically necessary for compliance with applicable anti-idling law. It also can be appreciated that there is a need for such a method to contemplate use of a wide array of heating and cooling apparatuses, including those featuring automatic temperature control capability. The present invention substantially fulfills these needs.

SUMMARY

The present invention is directed to a method and system for controlling a vehicle engine to maintain cabin air temperature within a defined acceptable range while minimizing engine idling such that the vehicle's engine will be run only when the ambient and vehicle cabin temperatures are both outside the acceptable range. The present invention is further directed to such a method and system that allows virtually all types of vehicle heating and cooling apparatuses to be employed.

The method of the present invention comprises the steps of determining a cabin temperature range that is acceptable to the user, monitoring ambient and cabin temperatures, determining whether attendant vehicle conditions are suitable for controlled starting or stopping of the engine and, if so, starting the engine when the current cabin and ambient temperatures are both above or below the user's acceptable range and subsequently stopping the engine when either: (a) the ambient temperature moves within the range or (b) the cabin temperature is at the upper limit or lower limit of the range after having been raised or lowered through the range. The system of the present invention, at minimum, comprises an operator interface, a system switch, temperature sensors and a computer (e.g., the vehicle's engine control unit) that communicates with those system components and with the vehicle's engine and ignition switch for the purpose of executing the method.

It is an object of the present invention to provide an engine control method that allows engine operation to occur only when the current temperature of ambient air is such that flow of ambient air into the vehicle cabin could not bring the cabin within a temperature range deemed acceptable to the vehicle operator. This aspect of the invention ensures that the engine will not run at times when it would appear that the operator could raise or lower cabin temperature to within the acceptable range by simply opening the vehicle's windows or circulation vents, rather than burning fuel to air condition or heat the cabin.

It is another object of the present invention to provide an engine control method that causes the engine of a non-moving vehicle to shut off whenever the vehicle cabin experiences a sudden drastic temperature change that is likely caused by the opening of a door or rolling down of a window such that the welcomed warm or cool air being emitted by the vehicle's heating/cooling apparatus escapes the vehicle cabin.

Conversely, it is another object of the present invention to provide an engine control method that causes the engine to shut off when there is no appreciable change in vehicle cabin temperature over some finite period of time. Thus, the method prevents engine idling from being unnecessarily prolonged due to ineffectiveness or inoperability of the vehicle's heating and cooling apparatus or due to effective use of an automatic temperature control system which does not allow the cabin temperature to deviate from within the acceptable range (and thereby trigger engine shutdown).

It is another object of the present invention to provide an engine control method in which its user may select a maximum time interval for which the engine will be allowed to continuously run, under any circumstances. Thus, the user may tailor engine operation parameters so as to conform to his arbitrary desire or to anti-idling law of the particular jurisdiction in which he finds himself.

It is a further object of the present invention to provide safety controls that prevent the engine from being automatically started when certain conditions are present. For examples, when the vehicle's parking brake is not engaged or its transmission is in driving gear or its engine compartment cover is open, the present invention will not start the engine, regardless of where the cabin and ambient temperatures may lie in relation to the acceptable range. These safety controls are designed such that the engine may be started only when conditions indicate that the vehicle is safely parked and that no person is working within its engine compartment.

Similarly, it is yet another object of the present invention to provide additional safety controls that shut off a running engine in response to certain vehicle condition changes that indicate that the vehicle is no longer safely parked. For examples, when the engine compartment cover is opened or when the parking brake is released, the system will initiate automatic engine shut down.

These and other objects of the present invention will become apparent upon review of the following detailed description and drawings.

DETAILED DESCRIPTION OF THE PREFERRED EMBODIMENTS

Figure 1:
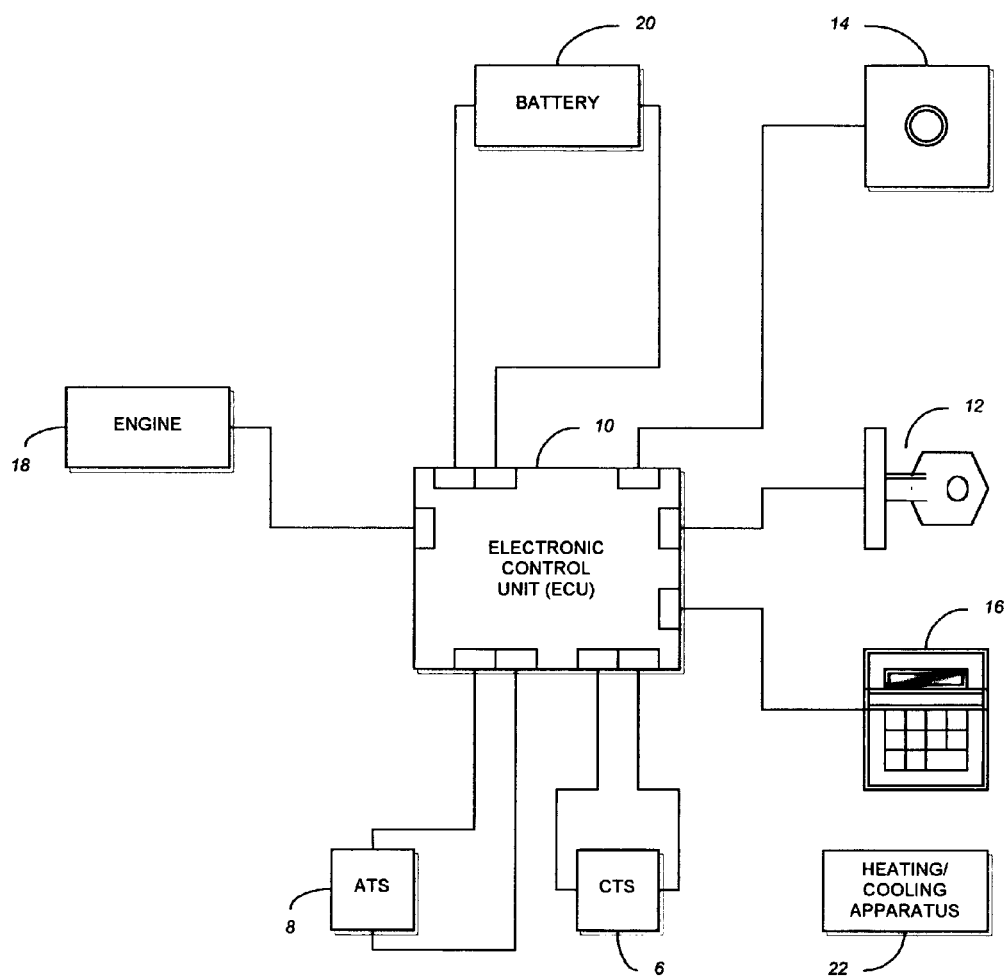
FIG. 1 is a block diagram showing an engine control system according to an embodiment of the present invention.

The engine control method and system of the present invention employs several integrated components. FIG. 1 is a schematic illustrating an embodiment of the system of the present invention, an embodiment whose components include: a system switch 14; an operator interface 16; an ignition switch 12; a computer, such as an electronic control unit (ECU) 10; one or more cabin temperature sensors 6; and one or more ambient temperature sensors 8. The method of the present invention calls for these system components to be installed in or about a vehicle that is most likely a diesel-powered vehicle, but may be any vehicle having an engine 18, a battery 20 and a heating/cooling apparatus 22. Because all of the system components are either ordinarily found in vehicles or are small and lightweight accessories, the system should be compatible with virtually any vehicle.

ECU 10 includes a multitude of ports to which other system components are wired for communication with ECU 10. ECU 10 also includes computer-readable memory containing instructions that are compared against inputs received from other system components and then executed to produce output signals for controlling automatic starting and stopping of engine 18.

ECU 10 is powered by battery 20. As with any computer or engine control unit apparatus, ECU 10 will have a minimum voltage requirement for its operation. Moreover, as will be discussed, an embodiment of the greater engine control system requires that ECU 10 receive a charge of at least 11.5 V as a precondition to starting engine 18. This requirement will help ensure that the system does not operate entirely from battery voltage when, for example, the vehicle's alternator fails. ECU 10 is equipped with a system voltage sensor 4 for determining voltage.

Disposed within the vehicle cabin are cabin temperature sensors 6 which continuously measure the air temperature inside the cabin and communicate those cabin temperature readings to ECU 10. Mounted on the exterior of the vehicle and exposed to the outdoors are ambient temperature sensors 8 which continuously measure the temperature of ambient air and communicate those ambient temperature readings to ECU 10.

Ignition switch 12 is a typical vehicle ignition switch having on and off positions and being adjustable by a vehicle operator using a key. System switch 14 also has on and off positions and is manually adjustable. Whenever ignition switch 12 is in its on position, the engine control system is disabled. In the particular embodiment shown in FIG. 1, the engine control system is to be capable of automatically starting engine 18 when both: (1) ignition switch 12 is in its off position and (2) system switch 14 is in its on position. In other embodiments of the invention, additional auto-start enabling conditions must exist, as will be discussed.

Operator interface 16 may be simply a digital thermostat or a touch screen device adapted to receive an operator's inputs regarding temperature range limits and then communicate those inputs to ECU 10. Whatever its form, interface 16 allows the operator to select a temperature range within which he desires the vehicle's cabin temperature to be kept by the system and method of the present invention. To wit, the operator may input into interface 16 both an upper limit temperature and a lower limit temperature, together, forming an acceptable range of cabin temperatures. Since the engine control method is intended to operate the engine 18 for the primary purpose of keeping cabin temperature within this acceptable range, the operator should select upper and lower limit temperatures that are sufficiently spaced apart so as to produce a range that the cabin temperature reasonably can be maintained within by running engine 18 and heating/cooling apparatus 22 only intermittently. To ensure that the recognized acceptable temperature range is sufficiently broad, one embodiment of the invention contemplates ECU 10 being capable of, itself, generating an appropriately broad acceptable range by either: (a) recognizing a lone temperature inputted into interface 16 as the midpoint of a range spanning 3° F. or greater; or (b) recognizing the lower of two inputted temperatures as the lower limit of a range spanning 3° F. or greater while rendering insignificant the higher inputted temperature.

Interface 16 may be additionally capable of receiving and sending to ECU 10 an operator's inputted selection of the maximum time interval during which engine 18 shall be allowed to continuously run. For instance, if the operator prefers that the engine not idle for more than ten consecutive minutes under any circumstances, he may input into interface 16 a maximum continuous run time selection of 10 minutes.

Figure 2:
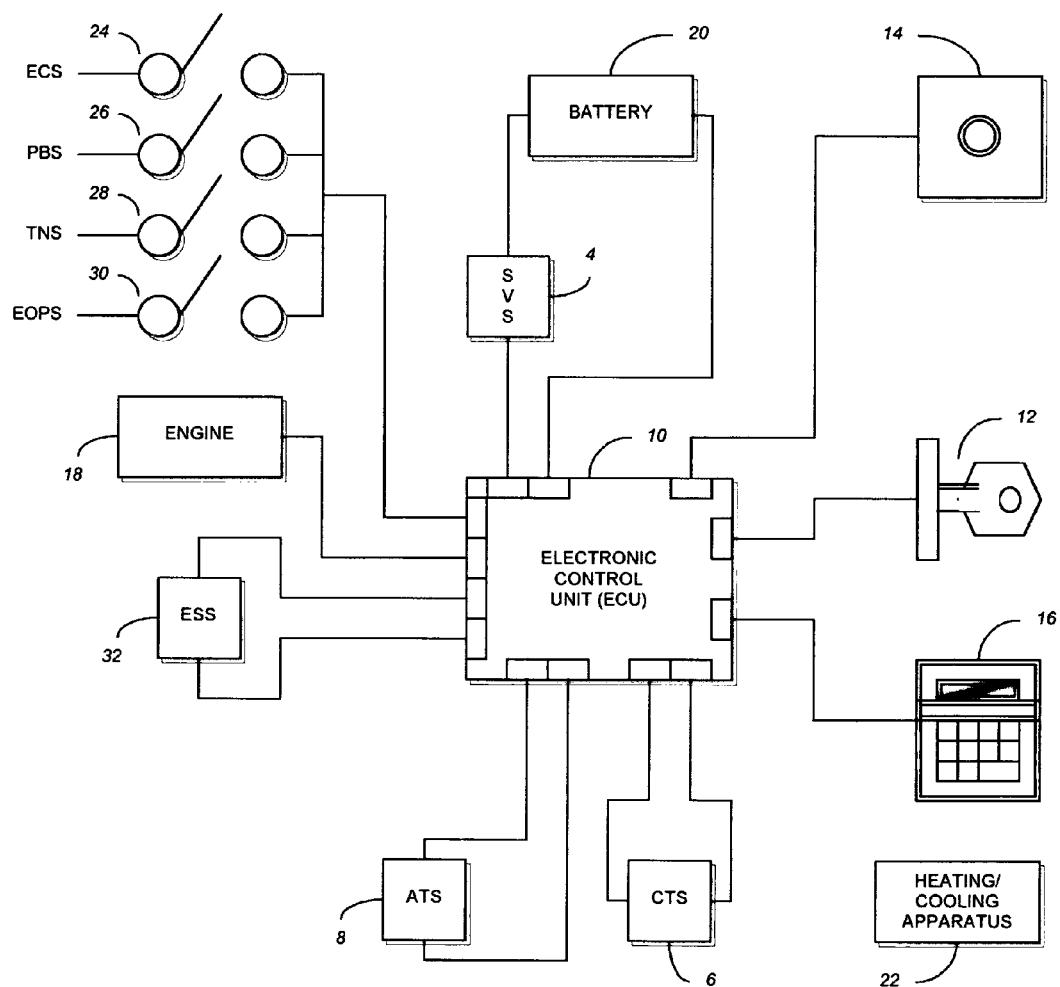
FIG. 2 is a block diagram showing an engine control system according to an alternative embodiment of the present invention that includes a plurality of safety controls.

As illustrated in FIG. 2, an alternative embodiment of the system of the present invention may incorporate additional components. In this alternative embodiment, system components include all of those of the embodiment shown in FIG. 1 as well as an engine compartment switch 24, a parking brake switch 26, a transmission neutral switch 28, an engine oil pressure switch 30 and an engine speed sensor 32—each in wired communication with ECU 10. Parking brake switch 26 and transmission neutral switch 28 are safety controls to prevent engine 18 from automatically starting when the vehicle is not safely parked and to turn off a running engine 18 when the vehicle ceases to be safely parked. Oil pressure switch 30 and speed sensor 32 relay information to ECU 10 so that automatic engine startup is not attempted when the current oil pressure and/or engine speed indicate that engine 18 is already running.

Figure 3:
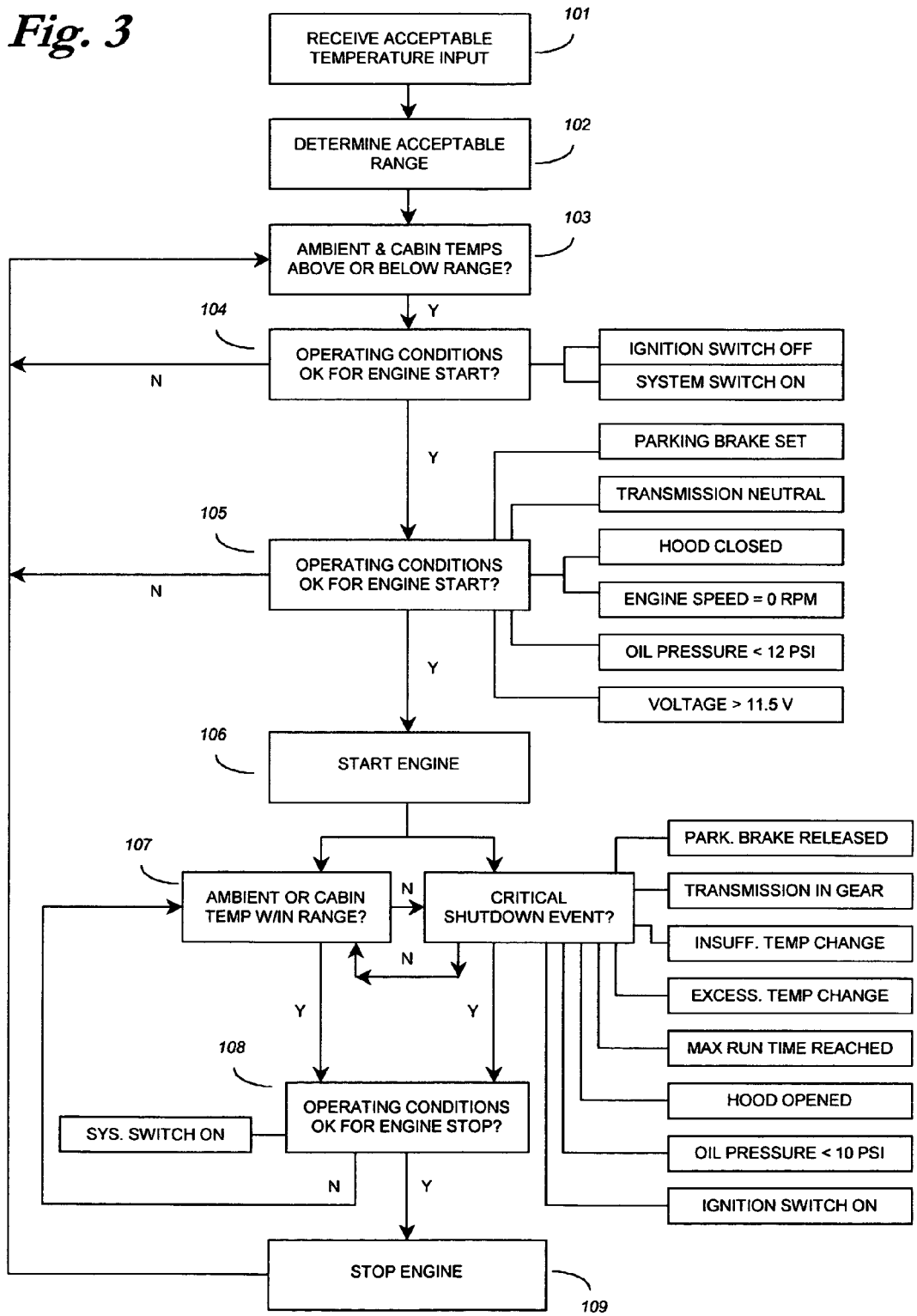
FIG. 3 is a flowchart illustrating operation of a method and system for controlling an engine according to an embodiment of the present invention.

FIG. 3 is a schematic illustrating the steps of a method of controlling an engine according to the present invention. In order to execute the method, a vehicle operator must input into interface 16 a temperature about which or two temperatures within which he desires the cabin to be maintained. In step 101, interface 16 signals ECU 10 regarding the inputted temperature(s). In response, as step 102, ECU 10 appropriately recognizes an acceptable range of temperatures based upon that input.

In step 103, ECU 10 monitors sensors 6 and 8 to determine the current cabin temperature and ambient temperature, respectively, and then compares temperature readings with the acceptable range. If either (a) at least one of the readings is within the range or (b) both temperatures are outside the range, but on opposite sides of the range (e.g., acceptable range is 69–74° F., ambient temp=75° F. and cabin temp=68° F.), then the method reverts to step 102. However, if current ambient and cabin temperatures both are above or below the acceptable range (e.g., acceptable range is 69–74° F., ambient temp=35° F. and cabin temp=40° F.), then the method proceeds to step 104.

In step 104, ECU 10 determines whether attendant operating conditions are acceptable for automatic engine startup. For example, in one embodiment of the invention, ECU 10 merely checks signaling from system switch 14 and ignition switch 12. In this embodiment, if system switch 14 is in on position and ignition switch 12 is in off position, operating conditions are deemed acceptable, and the method then proceeds immediately to the step of starting engine 18 (step 106).

However, in alternative embodiments (including one to be executed by the system depicted in FIG. 2), step 104 is immediately followed by step 105, wherein ECU 10 must confirm that additional operating conditions are acceptable for automatic engine startup. To wit, ECU 10 checks signaling from any one or a combination of parking brake switch 26, transmission neutral switch 28, engine compartment switch 24, engine speed sensor 32, engine oil pressure switch 30 and system voltage sensor 4 to determine if the parking brake is engaged, the transmission is in neutral, the engine compartment is closed (i.e., hood is closed), engine speed is substantially 0 rpm, engine oil pressure is less than 12 psi and battery voltage is greater than 11.5 V, respectively. If each operating condition required by the particular embodiment of the invention as a precondition to engine startup exists, ECU 10 starts engine 18 in step 106.

After engine 18 is started and is running, ECU 10 continues monitoring temperature sensors 6 and 8 to determine cabin temperature and ambient temperature, respectively, as part of step 107. Of course, the operator should have previously or should, at this time, set the vehicle's heating and cooling apparatus to operate and produce warm or cool air needed to raise or lower the cabin temperature to within, and then maybe through, the acceptable range. Otherwise, the cabin temperature might not move to within the acceptable range at any point during a period for which the engine control system is being used. Nevertheless, in all embodiments of the method of the present invention, any of the following three temperature change scenarios will provide a basis for ECU 10 to consider shutting off engine 18:

(a) ambient temperature moves into the acceptable range; or (b) cabin temperature rises to the upper limit of the acceptable range (after having risen from entirely below the range); or (c) cabin temperature falls to the lower limit of the acceptable range (after having fallen from entirely above the range)

Therefore, all embodiments of the method of the present invention require ECU 10 to continually compare current ambient and cabin temperatures with the acceptable range while engine 18 is running. Incidentally, where heating/cooling apparatus 22 is set to warm or cool the cabin to the extent that the cabin temperature will pass completely through the acceptable range and reach the furthest range limit (and, thereby, trigger a basis for engine stop), the present invention effectively maximizes the time for which the engine can thereafter remain off, because the cabin temperature will have to gradually reverse its course back through the range and beyond the opposite limit before engine 18 may be restarted. Obviously, the broader that the acceptable range is, the more significant this fact becomes.

In a first embodiment of the method, ECU 10 will have a basis upon which to consider stopping engine 18 only if one of the three aforementioned temperature changes occurs. Thus, in this first embodiment, the activities of step 107 need only consist of determining the current ambient and cabin temperatures and comparing them with the acceptable range.

In a second embodiment, the activities of step 107 include (a) determining ambient and cabin temperatures and comparing them with the acceptable range as well as (b) determining whether a critical shutdown event has occurred. Thus, in this second embodiment, ECU 10 will consider stopping engine 18 under any of the three temperature change scenarios, and it will also consider stopping it, completely irrespective of the relationship between the current temperatures and the acceptable range, if any of a host of critical shutdown events occurs.

One such critical shutdown event is an insufficient net change in cabin temperature over a specific time. In this embodiment, ECU 10 is programmed so that the current cabin temperature is repeatedly compared against the cabin temperature reading taken at some fixed time interval prior thereto. If a particular comparison reveals a temperature differential of less than the required amount (ex: less than 6 degrees), then ECU 10 will consider stopping engine 18 on the basis of an insufficient change in cabin temperature. This allows engine 18 to be stopped when indications are that either the vehicle cabin is not being sufficiently heated or cooled or the cabin temperature, although within the acceptable range, is unlikely to hit the upper/lower limit of the range and trigger an engine stop within a reasonable time. Thus, the system will function properly even when using a heating and cooling apparatus having automatic temperature control which keeps cabin temperature from straying outside the acceptable range.

Another critical shutdown event is an excessive net change in cabin temperature over a specific time. ECU 10 is programmed to similarly compare cabin temperature readings for the purpose of detecting an unusually high temperature differential that could indicate that a vehicle door was opened, since engine 18 has been running, and is allowing warmed or cooled air generated by heating/cooling apparatus 22 to escape the cabin.

Another critical shutdown event is elapse of the maximum continuous run time inputted, by the operator, into interface 16. Once engine 18 has been running for this amount of time, ECU 10 will consider stopping it regardless of any circumstance relative to temperature.

Still other critical shutdown events include movement of ignition switch 12 to the on position, disengagement of the parking brake (as indicated, to ECU 10, by parking brake switch 26); shifting of the transmission from neutral to a drive gear (as indicated by transmission neutral switch 28); opening of the engine compartment cover (as indicated by engine compartment switch 24); and dropping of engine oil pressure to below 10 psi (as indicated by engine oil pressure switch 30) after engine 18 has run for at least 30 seconds.

In any embodiment of the invention, if ECU 10 finds a proper basis upon which it may consider stopping engine 18, the method proceeds to step 108. In this step, ECU 10 further determines whether attendant operating conditions are acceptable for automatic engine stoppage. In a preferred embodiment, ECU 10, again, checks signaling from system switch 14 to ascertain whether switch 14 is in on position. If so, operating conditions are deemed acceptable for stopping engine 18, and ECU 10 stops engine 18 in step 109.

I claim:

1. A system for controlling an engine to maintain a comfortable cabin temperature within a vehicle having an engine, a battery and a heating/cooling apparatus, the system comprising:
   an operator interface receiving input regarding an acceptable range of temperatures from a vehicle operator and producing signals indicative of said acceptable range;
   a system switch which includes on and off positions, the system switch producing a signal indicating that the engine may be automatically started or stopped when said system switch is in an on position;
   an ignition switch which includes on and off positions, the ignition switch producing a signal indicating that the ignition is off;
   a plurality of temperature sensors, the temperature sensors producing signals indicative of ambient temperature and cabin temperature; and
   a computer in communication with the engine, the temperature sensors, the system switch, the operator interface and the ignition switch, the computer:
      determining an acceptable range of cabin temperatures based upon signals received from the operator interface;
      determining whether the engine may be automatically started or stopped; and
      controlling automatic starting and stopping of the engine.

2. The system of claim 1, wherein at least one temperature sensor is stationed inside the vehicle cabin and at least one temperature sensor is stationed outside the vehicle, whereby the inside sensor(s) produce signals indicative of cabin temperature and the outside sensor(s) produce signals indicative of ambient temperature.

3. The system of claim 1, wherein the operator interface further receives input regarding a maximum continuous run time and produces a signal indicative of said maximum continuous run time.

4. The system of claim 1 or 3, wherein the system further comprises:
   an engine compartment switch, the engine compartment switch producing a signal indicating that an engine compartment cover is in a closed position;
   a parking brake switch, the parking brake switch in communication with the computer and producing a signal that a parking brake is engaged;
   a transmission neutral switch, the transmission neutral switch in communication with the computer and producing a signal indicating that a transmission is in neutral position;
   an engine oil pressure switch, the engine oil pressure switch in communication with the computer and producing a signal indicating that engine oil pressure exceeds a predetermined value;
   a system voltage sensor, the system voltage sensor in communication with the computer and producing a signal indicating that power being supplied to the system is greater than 11.5 V; and
   an engine speed sensor, the speed sensor in communication with the computer and producing signals indicative of engine speed.

5. The system of claim 4, wherein at least one temperature sensor is stationed inside the vehicle cabin and at least one temperature sensor is stationed outside the vehicle, whereby the inside sensor(s) produce signals indicative of cabin temperature and the outside sensor(s) produce signals indicative of ambient temperature.

6. A method for controlling an engine to maintain a comfortable cabin temperature within a vehicle having an engine, a battery and a heating/cooling apparatus, the method comprising the steps of:
   determining an acceptable range of temperatures based on input from a vehicle operator;
   monitoring temperature sensors to determine current ambient and cabin temperatures;
   determining whether current ambient and cabin temperatures are both above or below the acceptable range;
   determining whether current operating conditions are acceptable for automatic engine starting;
   determining whether current operating conditions are acceptable for automatic engine stopping;
   automatically starting the engine when both ambient temperature and cabin temperature are both above or both below said acceptable range and operating conditions acceptable for automatic engine starting are present;
   automatically stopping the engine when ambient temperature is within said acceptable range and operating conditions acceptable for automatic engine stopping are present;
   automatically stopping the engine when cabin temperature is at an upper limit of said acceptable range and operating conditions acceptable for automatic engine stopping are present, if the engine was automatically started in response to ambient and cabin temperatures having been both below said acceptable range; and automatically stopping the engine when cabin temperature is at a lower limit of said acceptable range and operating conditions acceptable for automatic engine stopping are present, if the engine was automatically started in response to ambient and cabin temperatures having been both above said acceptable range.

7. The method of claim 6, wherein the step of determining the acceptable range of temperatures comprises recognizing the upper limit and lower limit of said acceptable range, both limits inputted into an operator interface by the vehicle operator.

8. The method of claim 6, wherein the step of determining the acceptable range of temperatures comprises generating a range spanning at least 3° F. and recognizing, as its lower limit, a temperature inputted into an operator interface by the vehicle operator.

9. The method of claim 6, wherein the operating conditions acceptable for automatic engine starting comprise a system switch in an on position and an ignition switch in an off position and wherein the operating conditions acceptable for automatic engine stopping comprise the system switch in an on position.

10. The method of claim 9, wherein the operating conditions acceptable for automatic engine starting further comprise at least one of the following conditions: a parking brake that is engaged, a transmission in neutral position, a hood that is closed, the engine having a speed of substantially 0 rpm, the engine having an oil pressure of less than 12 psi and the battery having a voltage of greater than 11.5 V.

11. A method for controlling an engine to maintain a comfortable cabin temperature within a vehicle having an engine, a battery and a heating/cooling apparatus, the method comprising the steps of:

determining an acceptable range of temperatures based on input from a vehicle operator;

monitoring temperature sensors to determine current ambient and cabin temperatures;

determining whether current ambient and cabin temperatures are both above or below the acceptable range;

determining whether current operating conditions are acceptable for automatic engine starting;

determining whether current operating conditions are acceptable for automatic engine stopping;

automatically starting the engine when both ambient temperature and cabin temperature are both above or both below said acceptable range and operating conditions acceptable for automatic engine starting are present;

automatically stopping the engine when ambient temperature is within said acceptable range and operating conditions acceptable for automatic engine stopping are present;

automatically stopping the engine when cabin temperature is at an upper limit of said acceptable range and operating conditions acceptable for automatic engine stopping are present, if the engine was automatically started in response to ambient and cabin temperatures having been both below said acceptable range;

automatically stopping the engine when cabin temperature is at a lower limit of said acceptable range and operating conditions acceptable for automatic engine stopping are present, if the engine was automatically started in response to ambient and cabin temperatures having been both above said acceptable range; and automatically stopping the engine when at least one of a plurality of critical shutdown events occurs and operating conditions acceptable for automatic engine stopping are present.

12. The method of claim 11, wherein the step of determining the acceptable range of temperatures comprises recognizing the upper limit and lower limit of said acceptable range, both limits inputted into an operator interface by the vehicle operator.

13. The method of claim 11, wherein the step of determining the acceptable range of temperatures comprises generating a range spanning at least 3° F. and recognizing, as its lower limit, a temperature inputted into an operator interface by the vehicle operator.

14. The method of claim 11, wherein the operating conditions acceptable for automatic engine starting comprise a system switch in an on position and an ignition switch in an off position and wherein the operating conditions acceptable for automatic engine stopping comprise the system switch in an on position.

15. The method of claim 14, wherein the operating conditions acceptable for automatic engine starting further comprise at least one of the following conditions: a parking brake that is engaged, a transmission in neutral position, an engine compartment that is closed, the engine having a speed of substantially 0 rpm, the engine having an oil pressure of less than 12 psi and the battery having a voltage of greater than 11.5 V.

16. The method of claim 11, wherein the plurality of critical shutdown events includes:

insufficient net change in cabin temperature over a first predetermined time;

excessive net change in cabin temperature over a second predetermined time;

the engine running for a maximum continuous run time, wherein said maximum continuous run time is based on input into the operator interface by the vehicle operator;

an ignition switch turned to an on position a parking brake disengaged;

a transmission put into gear;

an engine compartment opened; and the engine having an oil pressure falling below 10 psi if the engine has run at least 30 seconds.

17. The method of claim 16, wherein said excessive net change is greater than 5° F. and said second predetermined time is up to 30 seconds.

18. The method of claim 16, wherein said insufficient net change is less than 6° F. and said first predetermined time is 3 to 10 minutes.

* * * * *